United States Patent
Bender

[11] 3,844,840
[45] Oct. 29, 1974

[54] SOLAR ENERGY HELMET

[76] Inventor: Ray C. Bender, 2626 Norwood Ave., Pittsburg, Pa. 15214

[22] Filed: Sept. 27, 1973

[21] Appl. No.: 401,518

[52] U.S. Cl. ............... 136/89, 2/3 R, 250/215
[51] Int. Cl. .................................. H01l 15/02
[58] Field of Search ............... 136/89; 2/3, 5, 6; 325/310; 250/215

[56] References Cited
UNITED STATES PATENTS

| | | | |
|---|---|---|---|
| 2,818,511 | 12/1957 | Ullery, Jr. et al. | 2/5 X |
| 2,904,645 | 9/1959 | Sarles | 325/310 X |
| 2,919,353 | 12/1959 | Paradise | 136/89 X |
| 3,294,401 | 12/1966 | Nicholas et al. | 250/215 X |
| 3,437,818 | 4/1969 | Shattuck | 136/89 UX |

*Primary Examiner*—A. B. Curtis
*Attorney, Agent, or Firm*—Robert K. Rhea

[57] ABSTRACT

The substantially hemispherical portion of a cycle rider's helmet is covered with a plurality of solar energy electric current generating cells. Conductors, connected with the cells, are in turn connected to a junction plate for energizing a hearing aid or a small transistorized radio carried by the user.

2 Claims, 3 Drawing Figures

PATENTED OCT 29 1974 3,844,840
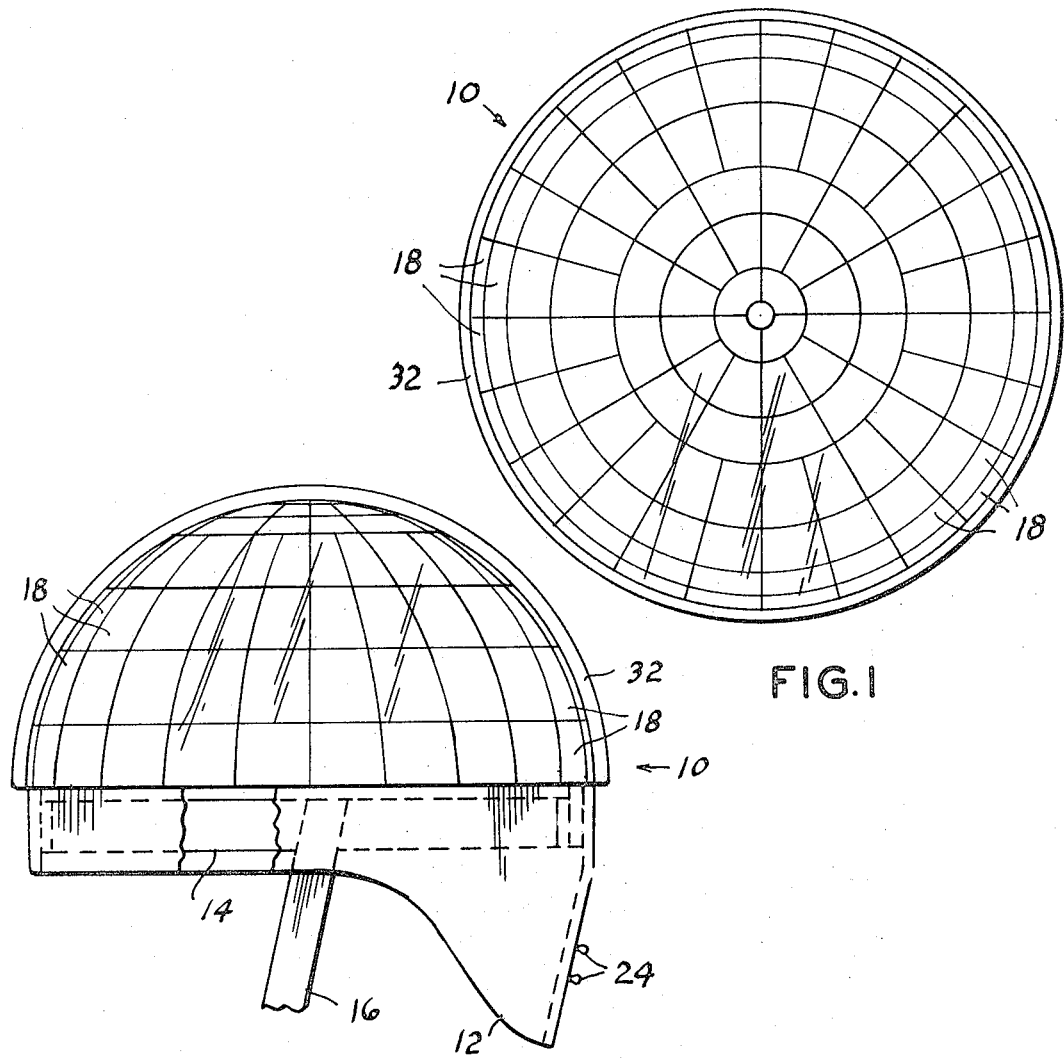
FIG. 1
FIG. 2
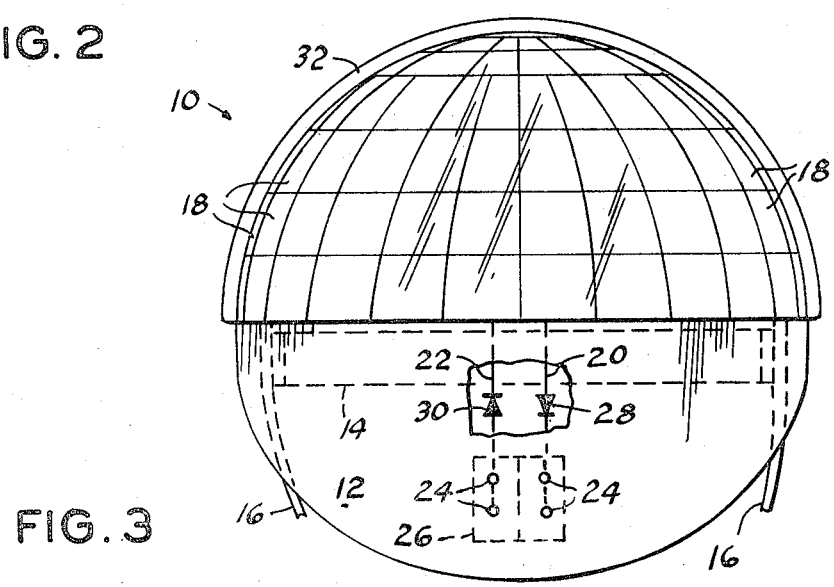
FIG. 3

SOLAR ENERGY HELMET

BACKGROUND OF THE INVENTION

1. Field of the Invention

The present invention relates to a solar electrical energy source for cycle riders and more particularly to a cycle rider's helmet covered with solar electric energy generating cells for supplying a source of electrical energy for small radios, or the like.

2. Description of the Prior Art

It is well known that light energy, particularly sun rays, may be used to produce an electrical current by the use of photocells or solar cells.

U.S. Pat. No. 2,780,765 discloses photosensitive elements for recharging a battery. U.S. Pat. No. 3,444,946 discloses the use of solar cells for recharging the battery of a vehicle.

This invention provides a plurality of solar cells which overlies the substantially hemispherical portion of a cycle rider's helmet to provide a source of electrical energy for operating the user's hearing aid or a small transistorized radio carried by the user.

SUMMARY OF THE INVENTION

A plurality of electrical current generating solar cells are secured in juxtaposed overlying relation with respect to the outer surface of the substantially hemispherical portion of a conventional cycle rider's helmet. A transparent covering of plastic, or the like, overlies the solar cells to form a shield against damage thereto. Conductors, connected with the respective solar cells, are in turn connected to a junction plate secured to a depending portion of the helmet through diodes for protecting the solar cells. The element or elements to be energized are connected with the junction plate.

The principle object of this invention is to provide a source of electrical energy for use by a cycle rider when wearing a helmet.

BRIEF DESCRIPTION OF THE DRAWINGS

FIG. 1 is a top view of the helmet;
FIG. 2 is a side elevational view of FIG. 1; and,
FIG. 3 is a rear elevational view.

DESCRIPTION OF THE PREFERRED EMBODIMENT

Like characters of reference designate like parts in those figures of the drawings in which they occur.

In the drawings:

The reference numeral 10 indicates a substantially conventional cycle rider's helmet having a rearward depending portion 12 normally covering the rearward neck surface of the user. The helmet is provided with an adjustable head encircling band 14 having a pair of chin straps 16 connected therewith. A plurality of solar cells 18 are secured to the outer surface of the upper substantially hemispherical shape of the helmet in juxtaposed relation. The cells 18 are shown truncated triangular in plan view to utilize substantially all of the hemispherical shape but may be of other configuration, if desired, such as hexagonal. In structure the cells 18 are conventional, such as the solar energy cells disclosed by U.S. Pat. No. 2,780,756 or U.S. Pat. No. 3,005,862. The cells are individually and collectively connected by wiring, not shown, in turn connected with a pair of conductors 20 and 22 attached to terminals 24 forming a part of a junction plate 26 secured to the depending neck portion 12. Diodes 28 and 30 are interposed in the respective conductor 20 and 22 to prevent damage to the solar cells 18. An outer substantially hemispherical-shaped layer of transparent material 32 overlies the bank of solar cells 18 to prevent damage thereto.

OPERATION

In operation the helmet is worn by a cycle rider and during daylight hours the solar cells 18 generate an electrical potential at the junction plate 26 whereby an electrical apparatus, to be operated, such as a radio, or the like, not shown, is connected with the junction plate terminals 24.

Obviously the invention is susceptible to changes or alterations without defeating its practicability, therefore, I do not wish to be confined to the preferred embodiment shown in the drawings and described herein.

I claim:

1. In a cycle helmet having a substantially hemispherical top portion and a depending rearward neck portion, the improvement comprising:
   a plurality of juxtaposed solar cells overlying said hemispherical top portion;
   a junction plate secured to said neck portion;
   a circuit comprising wiring connecting said solar cells with said junction plate; and,
   a protective coating of transparent material overlying said solar cells.

2. The combination according to claim 1 and further including; a diode interposed in the wiring of said circuit between the solar cells and said junction plate.

* * * * *